(12) United States Patent
Roman et al.

(10) Patent No.: US 11,057,787 B2
(45) Date of Patent: Jul. 6, 2021

(54) METHOD AND TEST SYSTEM FOR MOBILE NETWORK TESTING AS WELL AS PREDICTION SYSTEM

(71) Applicant: Rohde & Schwarz GmbH & Co. KG, Munich (DE)

(72) Inventors: Miguel Angel Roman, Munich (DE); David Gonzalez, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/242,859

(22) Filed: Jan. 8, 2019

(65) Prior Publication Data

US 2019/0246298 A1 Aug. 8, 2019

(30) Foreign Application Priority Data

Feb. 7, 2018 (EP) .................................. 18155622

(51) Int. Cl.
*H04W 24/08* (2009.01)
*H04W 24/00* (2009.01)

(52) U.S. Cl.
CPC ........... *H04W 24/08* (2013.01); *H04W 24/00* (2013.01)

(58) Field of Classification Search
CPC .............................. H04W 24/08; H04W 24/00
USPC ........................................................ 455/424
See application file for complete search history.

(56) References Cited

U.S. PATENT DOCUMENTS

| | | | |
|---|---|---|---|
| 2003/0100299 A1* | 5/2003 | Ko | H04L 41/00 455/423 |
| 2011/0319071 A1 | 12/2011 | Beppler et al. | |
| 2013/0204815 A1* | 8/2013 | Grothmann | G06N 3/08 706/16 |
| 2015/0103685 A1 | 4/2015 | Butchko et al. | |
| 2015/0373565 A1* | 12/2015 | Safavi | H04L 41/5067 370/252 |
| 2016/0373944 A1* | 12/2016 | Jain | H04W 24/02 |
| 2017/0064591 A1 | 3/2017 | Padfield et al. | |

(Continued)

FOREIGN PATENT DOCUMENTS

| | | |
|---|---|---|
| CN | 102 946 613 A | 2/2013 |
| CN | 104 581 758 A | 4/2015 |
| CN | 104 835 103 A | 8/2015 |

OTHER PUBLICATIONS

Zhani, M.F., et al., "Analysis of Prediction Performance of Training-Based Models Using Real Network Traffic," 2008 International Symposium on Performance Evaluation of Computer and Telecommunication Systems, pp. 479-472, Jun. 2008.

(Continued)

*Primary Examiner* — Farid Seyedvosoghi
(74) *Attorney, Agent, or Firm* — Christensen O'Connor Johnson Kindness PLLC

(57) ABSTRACT

A method for mobile network testing is described wherein at least one testing device is used that is configured to be connected to a mobile network. A predefined set of test procedures is run on the at least one testing device in order to obtain test results assigned to at least one test parameter. The test results of the test procedures are evaluated via a machine learning model. The machine learning model is trained to predict output parameters assigned to the quality of a service based on the test results obtained. Further, a test system, a method for mobile network testing as well as a prediction system are described.

15 Claims, 3 Drawing Sheets

(56) References Cited

U.S. PATENT DOCUMENTS

| | | |
|---|---|---|
| 2017/0215094 A1 | 7/2017 | Akoum et al. |
| 2017/0279921 A1* | 9/2017 | Foulkes .............. H04L 41/0816 |
| 2018/0206136 A1* | 7/2018 | Chow ................... H04W 24/08 |
| 2018/0242178 A1* | 8/2018 | Barton ................. H04B 17/391 |

OTHER PUBLICATIONS

CMCC, "Motivation for SID Proposal for RAN-centric BigData Collection and Utilization," 3GPP TSG RAN meeting #79, Chennai, India, Mar. 2018, 11 pages.

\* cited by examiner

METHOD AND TEST SYSTEM FOR MOBILE NETWORK TESTING AS WELL AS PREDICTION SYSTEM

FIELD OF THE DISCLOSURE

Embodiments of the present disclosure relate to a method for mobile network testing, a test system for mobile network testing as well as a prediction system for predicting output parameters assigned to the quality of at least one service.

BACKGROUND

Nowadays, telecommunication networks as well as network communication itself increase so that testing of mobile networks becomes more and more important. So far, operators have to run certain drive testing campaigns with special testing equipment in order to test the mobile network(s). The drive testing campaigns simulate the behavior of mobile subscribers within the mobile network(s) under test wherein the behavior relates to calls, web browsing and/or video playing.

While running the drive testing campaigns, the special testing equipment records network measurements wherein the data recorded is used to determine the quality of the network for certain services used within the network, in particular the quality of experience of the mobile subscribers with regard to the respective services used.

In the state of the art, several testing campaigns have to be run in order to obtain the desired information or rather to obtain sufficient data to evaluate the quality of several services, in particular the quality of experience of the mobile subscribers with regard to the several services. Thus, a lot of efforts are required in order to obtain the data or rather information required to test a mobile network sufficiently.

Accordingly, there is a need for a simpler and cost-efficient possibility to obtain the data or rather information required in an easier manner so that mobile network testing can be improved.

SUMMARY

Embodiments of the present disclosure provide a method for mobile network testing by using at least one testing device configured to be connected to a mobile network, comprising the following steps:
running a predefined set of test procedures on the at least one testing device in order to obtain test results assigned to at least one test parameter;
evaluating the test results of the test procedures via a machine learning model; and
training the machine learning model to predict output parameters assigned to the quality of a service based on the test results obtained.

Further, embodiments of the present disclosure provide a test system for mobile network testing, comprising at least one testing device and a processing unit configured to run a machine learning model to be trained, wherein the processing unit is configured to receive test results of a set of test procedures run on the at least one testing device and to evaluate the test results via the machine learning model, and wherein the processing unit is configured to train the machine learning model to predict output parameters assigned to the quality of a service based on the test results obtained.

The present disclosure is based on the finding that network testing can be simplified by using deep learning models such as a machine learning model in order to predict output parameters assigned to the quality of a certain service. Hence, the time spent for mobile network testing can be reduced significantly once the machine learning model has been trained.

The training of the machine learning model may correspond to a supervised learning as the machine learning is done with labeled training data that may consist of a set of training examples corresponding to the respective test results obtained. Each training example may correspond to a pair consisting of a certain input object (input parameter) as well as a desired output parameter that is also called supervisory signal, namely a parameter indicating the quality of the service (output parameter). The supervised learning algorithm used by the machine learning model analyzes the training data and generates an inferred mathematical model, for instance a function, which can be used for mapping new examples that go beyond the training examples.

In general, the quality of the service (QoS) defined by the output parameters of the machine learning model may relate to the quality of experience of the network participants (users of the network under test) when using the respective network service. For instance, the quality of the service (QoS) is standardized by IEEE 802.1p.

The (network) service may generally relate to an application requiring data from the network to be tested such as a mobile application running on a mobile end device, for instance a messaging service, a social media service and/or a service related to a video platform.

According to an aspect, the test procedures running on the at least one testing device simulate the behavior of participants of the mobile network, for example wherein calls, web browsing, video playing and/or downloads are simulated. Hence, the test procedures used for generating data evaluated for training purposes correspond to the drive testing campaigns that are run in the state of the art every time when the quality of a certain service has to be tested. However, the time spent as well as the efforts can be reduced due to the fact that the test procedures only have to run to train the machine learning model. Once the machine learning model has been trained appropriately, the testing campaigns to be run can be reduced significantly.

The behavior of the participants of the mobile network corresponds to the mobile sub scribers behavior mentioned earlier.

Another aspect provides that the training of the machine learning model is based on the at least one test parameter, for example a series of test parameters, together with the resulting output parameters assigned to the quality of a respective service. The at least one test parameter as well as the resulting output parameter correspond to a pair consisting of a certain input parameter as well as a desired output parameter, namely a parameter indicating the quality of the service (QoS). Accordingly, a supervised learning is provided.

For example, a certain service may be tested by a respective test procedure. A series of test parameters may be obtained as test results of the several test procedures which are used as input parameters for the machine learning model. Together with the test parameters, the resulting output parameters assigned to the qualities of the respective services tested are inputted for training purposes such that the machine learning model is enabled to generate the respective mathematical model, for instance function, used for mapping new examples going beyond the training examples.

Furthermore, the machine learning model may be trained to predict the quality of several services based on the at least one test parameter. Hence, the machine learning model, as soon as it is trained, is enabled to predict the quality of several services even though it receives the at least one test parameter of only one test procedure. Thus, the time and the efforts required for testing the mobile network with regard to the qualities of several services can be reduced appropriately once the machine learning model is trained.

For instance, the machine learning model is trained to predict the quality of at least one mobile network application. Thus, the mobile network application may correspond to popular internet services that are running on mobile user devices (end devices). The popular internet services may relate to messaging services, social media services and/or services providing videos.

As mentioned earlier, the machine learning trained is configured to predict the quality of the several different services (mobile network applications) without the need of running or rather using the respective application itself for evaluating the respective quality.

Another aspect provides that the test parameters are investigated over time and/or wherein geographical information is taken into account. Thus, the training, for example the test parameters used for the training, comprise time and/or geographical information. Hence, a timestamp for the respective test parameters may be provided. Moreover, topographical information as well as the position can be taken into account by the machine learning model.

For instance, the at least one test parameter corresponds to at least one network key performance indicator (KPI), for example network key performance indicators assigned to availability, health and/or performance. These network key performance indicators are the indicators typically used in telecommunication services. The availability, health and/or performance may also be called accessibility, retainability and/or quality. The accessibility or rather availability relates to the availability of the certain service, for instance if a user is enabled to set up a call and/or access certain resources such as downlink and/or uplink resources. The retainability or rather health corresponds to the ability to keep the established connection whereas the quality or rather performance deals with the quality of the connection established.

According to an embodiment, the at least one test parameter corresponds to a hypertext transfer protocol (http), a video test and/or a file transfer protocol (ftp), and/or wherein the at least one network key performance indicator corresponds to latency, round trip time, jitter, bandwidth, throughput, failure rate, signal level and/or rebuffering. The different network key performance indicators being important depend on the respective test parameter (test scenario applied). Generally, certain network key performance indicators effect almost all services whereas other network key performance indicators are only relevant for certain services. Accordingly, the network key performance indicators being relevant depend on the respective test parameter (test scenario applied).

Another aspect provides that the test results are evaluated on the testing device itself and/or wherein the test results are forwarded to a separate evaluation unit that evaluates the test results. For instance, the separate evaluation unit may be a server that is connected to the mobile network and/or the at least one testing device. Hence, the evaluation may be done internally or externally wherein this depends on the computational power of the respective device.

According to another aspect, the machine learning model is provided by a neural network, for example a recurrent neural network. A recurrent neural network (RNN) corresponds to an artificial neural network having connections between different units that form a directed cycle. This means, the different units are interconnected with each other such that a dynamic temporal behavior is provided by the neural network. In contrast to feed forward neural networks, the connections of the recurrent neural network form a cycle.

Generally, recurrent neural networks may comprise a direct feedback, an indirect feedback and/or a lateral feedback depending on the connections between the respective units.

According to an aspect, the test system is generally configured to perform a method as described above. Hence, the advantages related to the method also apply for the test system.

Moreover, embodiments of the present disclosure provide a method for mobile network testing by using at least one testing device configured to be connected to a mobile network, comprising the following steps:
providing a prediction system configured to predict output parameters assigned to the quality of a service by running a machine learning model trained;
performing a single test on the at least one testing device;
forwarding the test result of the single test and the at least one test parameter assigned to the test results to the prediction system for evaluating the test result; and
obtaining a prediction regarding the quality of at least one service from the prediction system, for example wherein predictions regarding the quality of at least one service or several services are obtained from the prediction system.

Hence, the quality of a service (QoS) can be predicted appropriately even though a single test is run such that it is not necessary to run several test campaigns in order to obtain information regarding the quality of the respective service.

In some embodiments, the service of which the quality is predicted is different to the service being tested by the single test performed on the at least one testing device due to the machine learning model trained. Thus, the quality of a service can be predicted by running a test (procedure) corresponding to a different service compared to the one the quality of which is predicted.

Generally, the prediction system is configured to predict the quality of several services based on the test parameters obtained, for example the test parameters of the single test. This can be done as the machine learning model is trained previously in an appropriate manner. Thus, the time spent for mobile network testing with regard to the quality of services using the mobile network as well as the efforts related thereto can be reduced appropriately.

For example, one test procedure (single test procedure) performed is enough for predicting the outcome of the other test procedures due to the machine learning model trained. Accordingly, the respective service used for testing the mobile network is not run.

The RNN ensures that the respective test sequences simulated by the machine learning model can be translated among each other to predict the respective output parameters regarding the respective qualities of services (QoS).

The test procedure may be run by using an application programming interface (API). Thus, it is not necessary to run the real application, but to make use of it.

In certain embodiments, the machine learning model used is trained by a method as defined above.

According to an aspect, the prediction system outputs a prediction regarding the quality of at least one mobile application. The at least one mobile (network) application may relate to an application that runs on a mobile end device (user end device) such as a mobile phone. Hence, the application may correspond to a messaging service, a video service and/or a social network service which generally up- and/or downloads data regarding pictures, videos and/or texts.

Moreover, embodiments of the present disclosure provide a prediction system for predicting output parameters assigned to the quality of at least one service, comprising a processing unit configured to run a machine learning model, wherein the machine learning model is trained by a method as described above and/or wherein the prediction system is configured to perform a method as mentioned above. Hence, the prediction system can be used to perform mobile network testing with regard to the quality of different services used within the mobile network in a time-efficient manner as only a single test is necessary for obtaining information regarding the quality of several services due to the machine learning model trained appropriately.

The respective test result of the single test is inputted into the machine learning model trained that outputs the output parameters of the other several services so that it is no more necessary to perform these appropriate tests. The quality of experience with respect to the different services can be predicted easily and in a time efficient manner so that the costs are reduced significantly.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
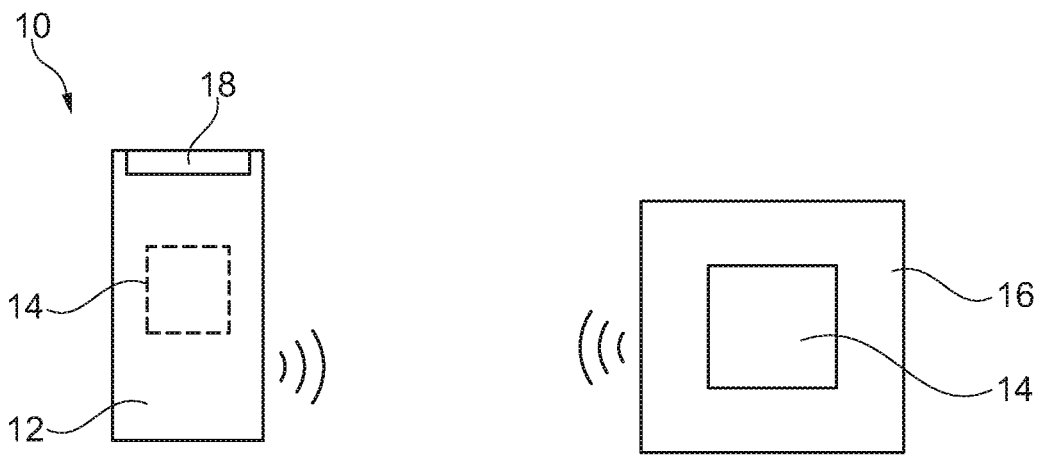
FIG. 1 schematically shows a test system for a mobile network testing according to one or more embodiments of the present disclosure.

In FIG. 1, a test system 10 for a mobile network testing is shown that comprises at least one testing device 12 as well as a processing unit 14 that is configured to run a machine learning model to be trained as will be described later with reference to FIG. 2. In the shown embodiment, the processing unit 14 is provided in a separately formed analyzing device 16.

The analyzing device 16, for example the processing unit 14, is connected to the at least one testing device 12, for instance via a wired or a wireless manner as indicated in the embodiment of FIG. 1, such that the processing unit 14 receives test results of a set of test procedures run on the at least one testing device 12 for obtaining information of the network under test to which the at least one testing device 12 is connected. The at least one testing device 12 is connected to the network under test via an appropriate network interface 18 provided by an antenna unit or a cable connection, for instance.

In embodiments of the present disclosure, the processing unit 14 is generally configured to evaluate the test results received from the at least one testing device 12 wherein the appropriate machine learning model is used for evaluating purposes.

Generally, the machine learning model may be established by a recurrent neural network. A recurrent neural network (RNN) corresponds to an artificial neural network having connections between different units that form a directed cycle. This means, the different units are interconnected with each other such that a dynamic temporal behavior is provided by the neural network. In contrast to feed forward neural networks, the connections of the recurrent neural network form a cycle. Recurrent neural networks may comprise a direct feedback, an indirect feedback and/or a lateral feedback depending on the connections between the respective units. In one embodiment, the neural network is trained using a suitable technique, such as gradient descent.

Figure 2:
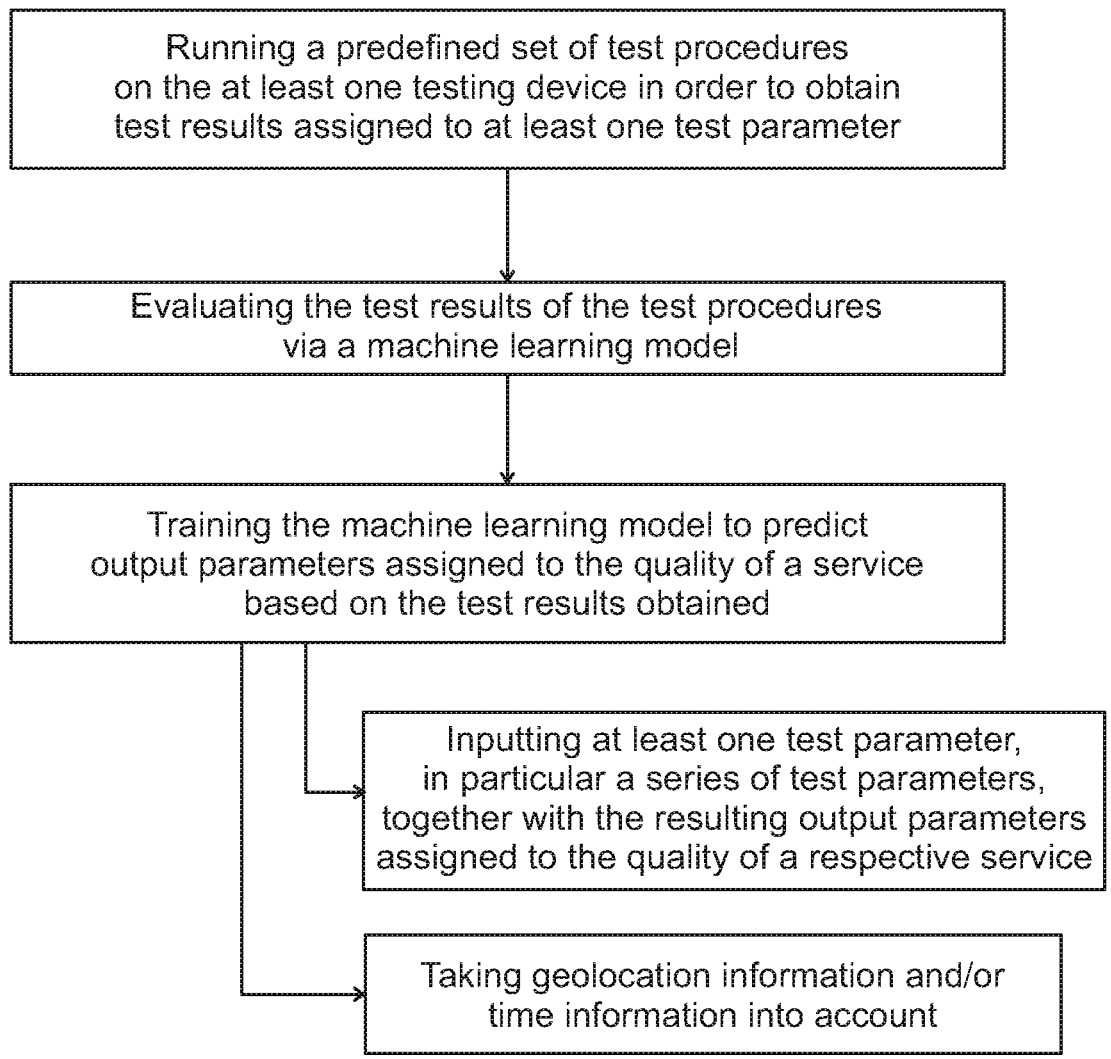
FIG. 2 shows a flowchart of a representative method for mobile network testing according to the present disclosure by using the test system of FIG. 1.

As also illustrated in FIG. 2, the test system 10, for example the processing unit 14, is configured to train the machine learning model appropriately as will be described hereinafter.

For the training purpose, a predefined set of test procedures runs on the at least one testing device 12 in order to obtain test results assigned to at least one test parameter, for example wherein the test results are assigned to a series of test parameters. For instance, the at least one test parameter is a hypertext transfer protocol, a video test and/or a file transfer protocol.

The test parameter may correspond to at least one network key performance indicator (KPI), for instance network key performance indicators assigned to availability, health and/ or performance.

In general, several test parameters or rather network key performance indicators may be recorded by the at least one testing device 12 during the test procedures or rather test scenarios applied.

The at least one test parameter may correspond to at least one specific network key performance indicator, for example to several network key performance indicators. The different network key performance indicators being important depend on the respective test parameter (test scenario applied). Generally, certain network key performance indicators effect almost all services whereas other network key performance indicators are only relevant for certain services. Accordingly, the network key performance indicators being relevant depend on the respective test parameter (test scenario applied).

For instance, the at least one network key performance indicator may correspond to latency, round trip time, jitter, bandwidth, throughput, failure rate, signal level and/or rebuffering.

In the shown embodiment, the analyzing device 16, for example the processing unit 14, is connected to the at least one testing device 12 and receives the respective test results, namely the test parameter(s) or rather the corresponding network key performance indicator(s), for evaluating purposes via the machine learning model to be trained. Hence, the analyzing device 16 corresponds to a separate evaluation unit with respect to the testing device 12, for instance a server.

The machine learning model is trained such that it is able to predict output parameters assigned to the quality of a service (QoS) based on the test results obtained by recognizing relationships and/or correlations between different data and/or information of the test parameter(s) or rather the corresponding network key performance indicator(s).

In general, the test procedures run on the at least one testing device 12 simulate the behavior of participants of the mobile network(s) under test with regard to at least one service, for instance a mobile network application. Thus, calls, web browsing, video playing and/or downloads are simulated appropriately which correspond to the typical behavior of network subscribers. The test procedures are run to obtain information regarding the quality of the respective service wherein the information is provided by corresponding output parameters that are assigned to the quality of the respective service.

For the training of the machine learning model, the at least one test parameter, for example a series of test parameters, together with the resulting output parameters assigned to the quality of the respective service are used as input parameters for the machine learning model. As mentioned above, the test parameters are assigned to the predefined set of test procedures run on the at least one testing device 12.

Accordingly, a supervised learning is provided as the machine learning is done with labeled training data that, consist of in some embodiments or is comprised of in other embodiments, sets of training examples used as input parameters, namely the at least one test parameter or rather the corresponding network key performance indicator(s) as well as the output parameters assigned to the quality of the respective service.

In addition to the test parameter(s) or rather the network key performance indicator(s), the training of the machine learning model may also take geolocation information and/or time information into account for training the machine learning model in a more accurate manner. Hence, topographic information may be encompassed. The time information ensures that time stamps are used for the respective information or rather data obtained during the testing.

In some embodiments, one or more computer-readable storage media is provided containing computer readable instructions embodied thereon that, when executed by a computing device, such as the processing unit 14, perform one or more steps of the method of FIG. 2 described above.

In general, the machine learning model is trained to predict the quality of several services based on the at least one test parameter as will be described later with reference to FIGS. 3 and 4.

In contrast to the shown embodiment, the test results may also be evaluated on the testing device 12 itself that may comprise the processing unit 14 as indicated by the dashed lines. Hence, the processing unit 14 may be integrated in the testing device 12. However, the testing device 12 itself requires a certain computational power for being enabled to run or rather train the machine learning model directly.

Figure 3:
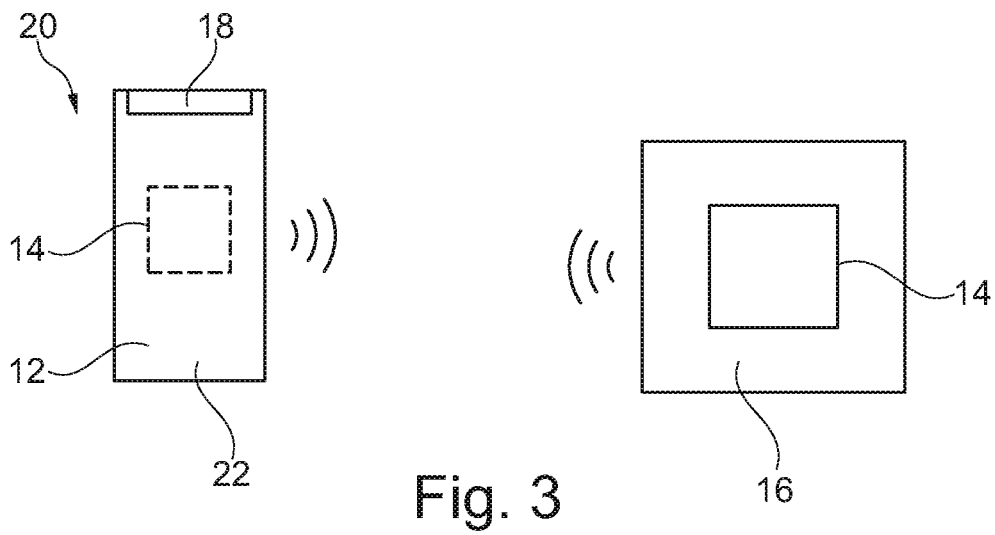
FIG. 3 schematically shows a representative embodiment of a prediction system according to the present disclosure.

In FIG. 3, a prediction system 20 is shown that comprises a testing device 22 as well as the processing unit 14 being established in an analyzing device 16.

Generally, the processing unit 14 is configured to run the machine learning model that has been trained previously as described above. Thus, the analyzing device 16 corresponds to the one shown in FIG. 1 as the respective machine learning model provided by the processing unit 14 was trained appropriately.

Further, the testing device 22 of the prediction system 20 may also correspond to the testing device 12 shown in FIG. 1 so that the same measuring equipment is used for training and measuring purposes.

Figure 4:
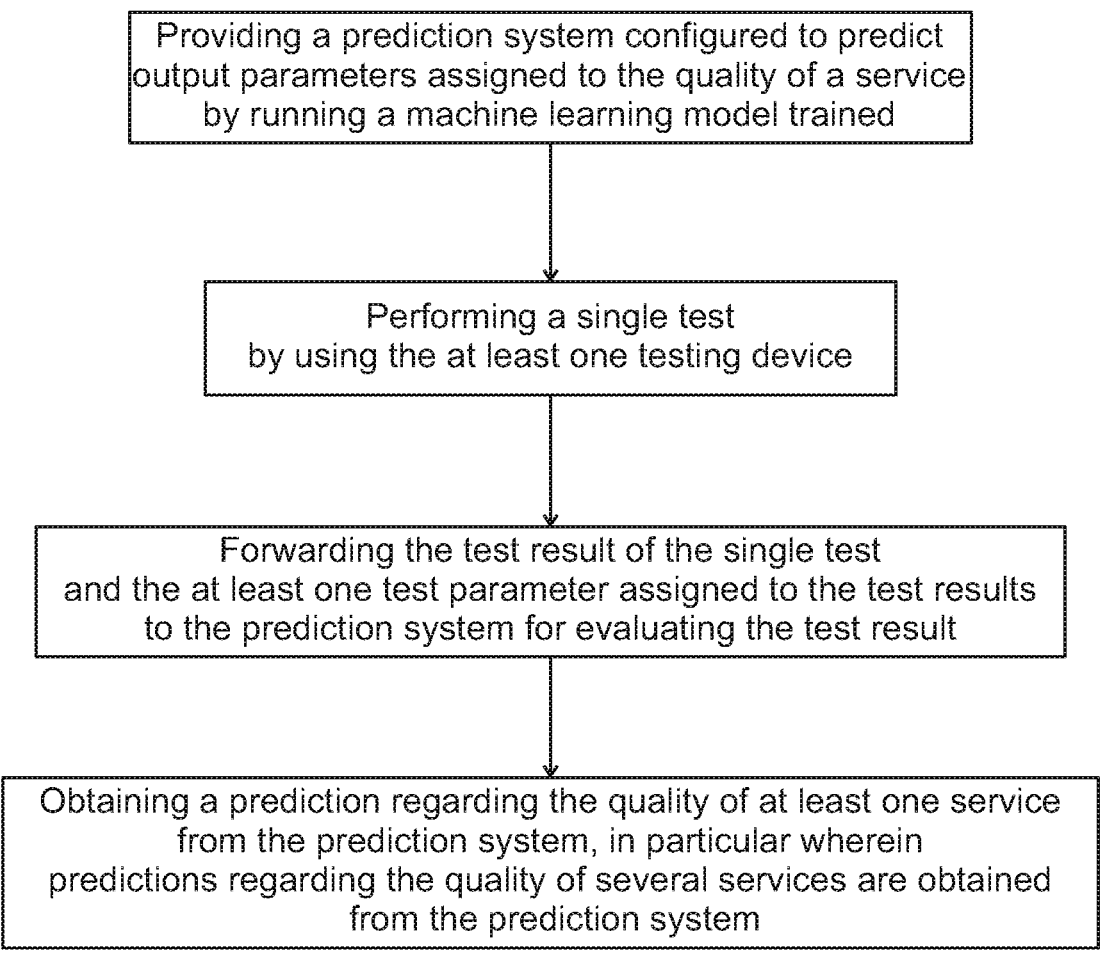
FIG. 4 shows a flowchart illustrating a representative method for mobile network testing by using the prediction system of FIG. 3.

In general, the prediction system 20 is configured to perform a method for mobile network testing as illustrated in FIG. 4.

Thus, the prediction system 20 is generally configured to provide a prediction regarding the quality of at least one service by running the machine learning model trained previously, for example wherein predictions regarding the quality of several services are obtained from the prediction system 20.

For mobile network testing purposes, a single test is sufficient to be performed by using the at least one testing device 12, 22 as the machine learning model is trained appropriately. Then, the test results of the single test performed is evaluated by the processing unit 14, for example the machine learning model. The test result obtained by the single test corresponds to the quality of a single service, for instance a certain mobile application.

This respective test result is forwarded to the processing unit 14, for example the machine learning model already trained, such that a prediction regarding the quality of a different service is outputted by the prediction system 20, for example the processing unit 14.

The machine learning model receives the at least one test parameter of the single test or the corresponding network key performance indicator(s) wherein the machine learning model was trained to predict the respective output parameters assigned to the quality of other services even though these services were not tested by the single test.

In general, the prediction system 20 is enabled to provide information (output parameters related to the quality) of different services even though a single test was performed that relates to a certain service as the machine learning model trained uses the test parameter(s) or rather the network key performance indicator(s) for evaluating purposes.

As mentioned with regard to the test system 10, the at least one testing device 12, 22 may comprise the processing unit 14 so that the machine learning model is run on the at least one testing device 12, 22 itself.

Accordingly, the network testing can be simplified due to the fact that the machine learning model has to be trained only once. As soon as the machine learning model has been trained appropriately, the network testing can be simplified significantly as only a single test has to be done in order to obtain information with regard to different services not tested (output parameters of several services, for example mobile network applications) from the machine learning model trained.

Thus, the number of test procedures to be performed for mobile network testing can be reduced significantly which saves time and efforts so that the testing costs are reduced.

Generally, the quality of the service may correspond to the quality of experience.

The machine learning model provided by the recurrent neural network (RNN) is configured to predict the outcome of a test measurement sequence (test procedure) based on another test measurement sequence (test procedure). Thus, a single test measurement sequence (test procedure) is sufficient to predict the outcomes of several test measurement sequences (test procedures) when the machine learning model is trained.

For instance, the machine learning model receives the test results of a hypertext transfer protocol download test (http download test) wherein the machine learning model is configured to predict the results of a video test occurring at the same time and the same location (time information as well as geographic information are taken into account) without performing the video test.

In some embodiments, one or more computer-readable storage media is provided containing computer readable instructions embodied thereon that, when executed by a computing device, such as the processing unit 14, perform one or more steps of the method of FIG. 4 described above.

Figure 5:
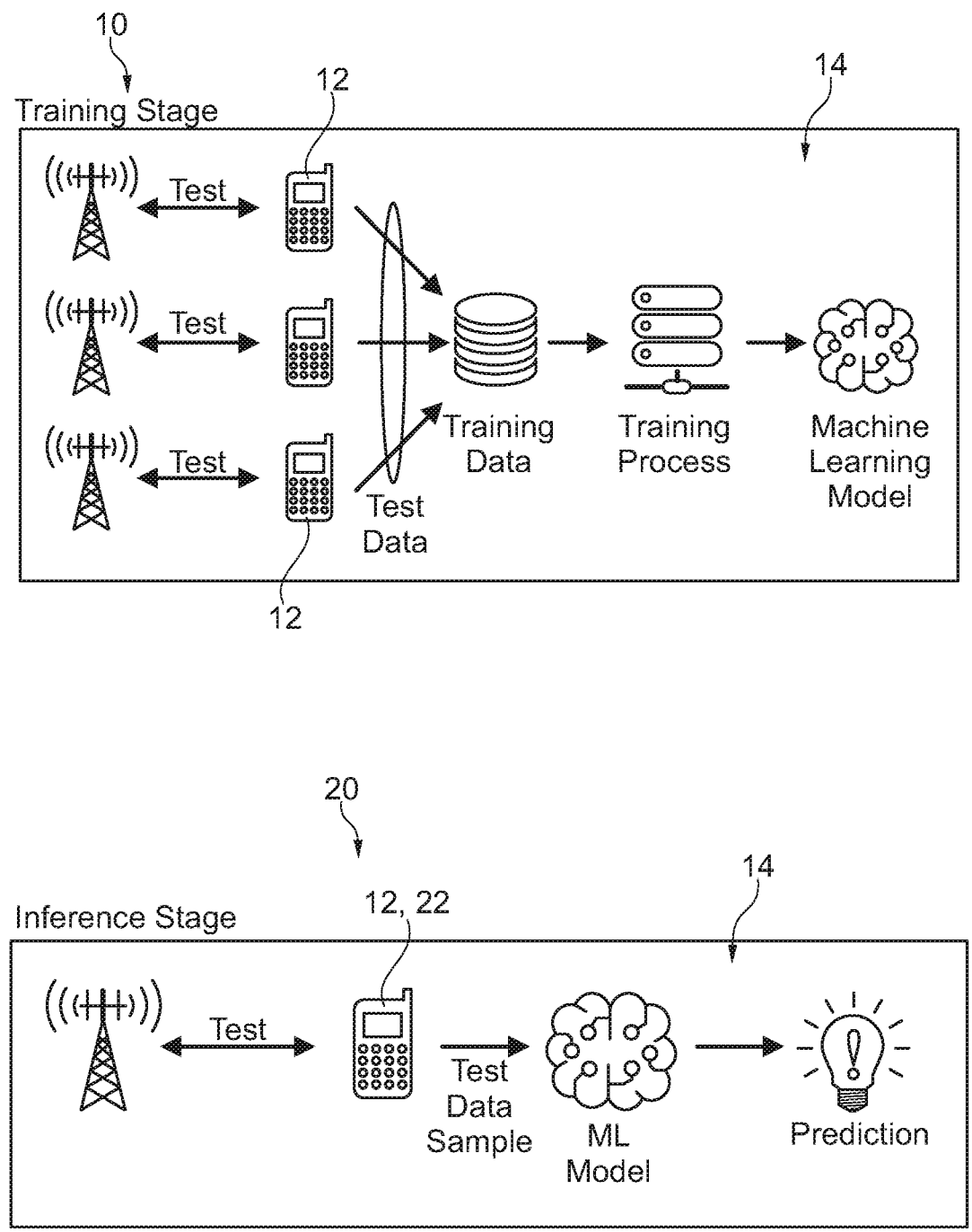
FIG. 5 shows a schematic overview illustrating a representative test system for mobile network testing according to the present disclosure and a representative prediction system according to the present disclosure.

In FIG. 5, a complete overview is shown that illustrates the test system 10 at the training stage and the prediction system 20 at the inference stage.

As indicated in FIG. 5, several test procedures are run on at least one testing device 12 or on several testing devices 12 for collecting test data used as training data for the machine learning model that is trained in a training process appropriately.

As shown for the training stage, the training process relates to inputting test parameter(s) or rather network key performance indicator(s) obtained from the test data, namely the test results of the respective test procedures, as well as the corresponding output parameters assigned to the quality of the respective service(s). Hence, pairs of information are used for the training corresponding to the supervised learning.

Once the machine learning model is trained, a single test is sufficient to provide information regarding other services as the machine learning model is enabled to predict the test results of test procedures with regard to other services appropriately based on the network key performance indicator(s) obtained from the single test. This is indicated on the right side of FIG. 5, namely at the inference stage.

Accordingly, it is no more necessary to perform the several test campaigns with a large number of tests in order to obtain output parameters assigned to the quality of several services.

The processing unit 14, for example, may be implemented as one or more microprocessors, microcomputers, microcontrollers, digital signal processors, central processing units, state machines, logic circuitries, and/or any devices that manipulate signals based on operational instructions. Among other capabilities, the processing unit 14 in some embodiments may be configured to fetch and execute computer-readable instructions stored in associated memory (not shown).

In some embodiments, the memory may comprise computer-readable media, for example, computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device. The computer-readable media include cooperating or interconnected computer-readable media, which exist exclusively on a processing system or distributed among multiple interconnected processing systems that may be local to, or remote from, the processing system.

It should be appreciated that embodiments of the present disclosure, or portions thereof, may have been described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, special purpose computing devices, etc. Embodiments described herein may also be implemented in distributed computing environments, using remote-processing devices that are linked through a communications network or the Internet.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for mobile network testing by using at least one testing device configured to be connected to a mobile network, comprising:
   running a predefined set of test procedures on the at least one testing device, wherein the set of test procedures running on the at least one testing device simulate behavior of participants of the mobile network;
   obtaining test results assigned to at least one test parameter by a processing unit, wherein the at least one test parameter corresponds to at least one network key performance indicator;
   evaluating the test results of the test procedures via a machine learning model by the processing unit; and
   training the machine learning model to predict output parameters assigned to a quality of a service based on the test results obtained by the processing unit;

wherein the training of the machine learning model is based on a series of test parameters together with the resulting output parameters assigned to a quality of a respective service, and wherein the at least one test parameter as well as the resulting output parameters correspond to a pair comprised of a certain input parameter as well as a desired output parameter; and wherein the machine learning model is trained to predict a quality of several services based on the at least one test parameter.

2. The method according to claim 1, wherein calls, web browsing, video playing and/or downloads are simulated.

3. The method according to claim 1, wherein the training of the machine learning model is based on the at least one test parameter together with the resulting output parameters assigned to the quality of a respective service.

4. The method according to claim 1, wherein the machine learning model is trained to predict a quality of at least one mobile network application.

5. The method according to claim 1, wherein the test parameters are investigated over time and/or wherein geographical information is taken into account.

6. The method according to claim 1, wherein the at least one test parameter corresponds to at least one network key performance indicator.

7. The method according to claim 1, wherein the at least one test parameter corresponds to network key performance indicators assigned to availability, health and/or performance.

8. The method according to claim 1, wherein the at least one test parameter corresponds to a hypertext transfer protocol, a video test and/or a file transfer protocol, and/or wherein the at least one network key performance indicator corresponds to latency, round trip time, jitter, bandwidth, throughput, failure rate, signal level and/or rebuffering.

9. The method according to claim 1, wherein the test results are evaluated on the testing device itself and/or wherein the test results are forwarded to a separate evaluation unit that evaluates the test results.

10. The method according to claim 1, wherein the machine learning model is provided by a neural network.

11. The method according to claim 1, wherein the machine learning model is provided by a recurrent neural network.

12. A test system for mobile network testing, comprising:
at least one testing device and a processing unit, the processing unit being configured to run a machine learning model to be trained, wherein the processing unit is configured to receive test results of a set of test procedures run on the at least one testing device and to evaluate the test results via the machine learning model, wherein the set of test procedures simulate behavior of participants of the mobile network, and wherein the processing unit is configured to train the machine learning model to predict output parameters assigned to a quality of a service based on the test results obtained;
wherein the service relates to an application requiring data from the mobile network;
wherein the training of the machine learning model is based on a series of test parameters together with the resulting output parameters assigned to a quality of a respective service, and wherein the at least one test parameter as well as the resulting output parameters correspond to a pair comprising a certain input parameter as well as a desired output parameter; and wherein the machine learning model is trained to predict a quality of several services based on the at least one test parameter.

13. The test system according to claim 12, wherein the test system is configured to:
run a predefined set of test procedures on the at least one testing device in order to obtain test results assigned to at least one test parameter;
evaluate the test results of the test procedures via a machine learning model; and
train the machine learning model to predict output parameters assigned to the quality of a service based on the test results obtained.

14. A method for mobile network testing by using at least one testing device configured to be connected to a mobile network, comprising:
running a predefined set of test procedures on the at least one testing device, wherein the set of test procedures running on the at least one testing device simulate behavior of participants of the mobile network;
obtaining test results assigned to at least one test parameter by a processing unit, wherein the at least one test parameter corresponds to at least one network key performance indicator;
evaluating the test results of the test procedures via a machine learning model by the processing unit; and
training the machine learning model to predict output parameters assigned to a quality of a service based on the test results obtained by the processing unit;
wherein the training of the machine learning model corresponds to a supervised learning as the machine learning is done with labeled training data that consist of a set of training examples corresponding to the respective test results obtained; and
wherein each training example corresponds to a pair including a certain input parameter as well as a desired output parameter.

15. A method for mobile network testing by using at least one testing device configured to be connected to a mobile network, comprising:
running a predefined set of test procedures on the at least one testing device, wherein the set of test procedures running on the at least one testing device simulate behavior of participants of the mobile network;
obtaining test results assigned to at least one test parameter by a processing unit, wherein the at least one test parameter corresponds to at least one network key performance indicator;
evaluating the test results of the test procedures via a machine learning model by the processing unit; and
training the machine learning model to predict output parameters assigned to a quality of a service based on the test results obtained by the processing unit;
wherein the service relates to a mobile application running on a mobile end device and requiring data from the mobile network to be tested;
wherein the method further comprises the steps of:
performing a single test by using the at least one testing device;
obtaining test results of the single test;
evaluating the test results obtained by the single test; and
predicting respective output parameters assigned to a quality of services other than the one tested by the single test.

* * * * *